United States Patent [19]

Klose

[11] 4,057,455

[45] Nov. 8, 1977

[54] TIRE STITCHING APPARATUS

[75] Inventor: Karl W. Klose, Findlay, Ohio

[73] Assignee: Cooper Tire and Rubber Company, Findlay, Ohio

[21] Appl. No.: 557,337

[22] Filed: Mar. 11, 1975

[51] Int. Cl.² .......................................... B29H 17/18
[52] U.S. Cl. .................................... 156/410; 156/421
[58] Field of Search ............... 156/123, 128 R, 128 I, 156/133, 394, 408–413, 421

[56] References Cited

U.S. PATENT DOCUMENTS

| 1,475,300 | 11/1923 | Harsel | 156/410 |
| 2,936,023 | 5/1960 | Giletta et al. | 156/410 |
| 3,047,048 | 7/1962 | Appleby | 156/410 |
| 3,244,575 | 4/1966 | Sabo et al. | 156/409 |
| 3,546,043 | 12/1970 | Miksch | 156/410 |
| 3,850,719 | 11/1974 | Leblond et al. | 156/408 |

Primary Examiner—Charles E. Van Horn
Assistant Examiner—John E. Kittle
Attorney, Agent, or Firm—Kemon & Estabrook

[57] ABSTRACT

An apparatus for consolidating the components of pneumatic tires consisting of a left and right hand assembly, each having a base plate arranged to move toward and away from one another. Each assembly includes a platform that is pivotally mounted on a base plate with actuating means carried by said platforms. The actuating means has associated therewith a stitcher wheel that is capable of moving into and out of engagement with the tire body being built and also capable of moving in an arcuate path over said tire body.

7 Claims, 3 Drawing Figures

TIRE STITCHING APPARATUS

BACKGROUND OF THE INVENTION

The present invention is directed to apparatus for surface bonding and assembly means therefor in the tire body buildng art and particularly as concerns the relative traversing motion between rotating tire supporting struture and pressing or bending means.

When plastic component such as unvulcanized sheets of rubber or rubberized fabric are assembled as in the building of tires; it is frequently necessary to bring the tacky surfaces of said sheets into intimate contact and work out entrained air bubbles by rolling the surface with a narrow roller device commonly referred to as a stitcher. This process, known as stitching, is normally accomplished by a relative motion between the materials to be consolidated and the stitching wheel whereby said wheel is biased against the surface of the material to be consolidated thereby tracing a line of contact on the material. This line of contact is progressively advanced laterally of the material thereby tracing a series of relatively parallel contact lines that tend to consolidate the material and thus work any entrained air out toward the open edge over the material surface where said air may escape.

The stitching of material that is in certain geometric shapes such as planes or cylinders may be accomplished by a relatively simple apparatus. The stitching of the various components or sheets of material of a cylindrical assembly is normally accomplished by bringing a pair of stitcher wheels into contact with the longitudinal center of the work piece. The rotational axis of each stitching wheel being parallel to the longitudinal axis of the cylindrical work piece. The work piece is then rotated about its own axis and with each of the stitcher wheels being biased against the surface of said work piece, they are gradually advanced laterally and in opposite directions. The stitcher wheels in their movement tend to trace a helix pattern of contact on the work surface, thereby progressively urging the various components of material into intimate contact with one another and thus displacing entrained air bubbles to an open edge of the material. The stitching of the more complex surfaces, such as the toroidal shape (doughnut) of tire structures, requires that the sticher wheel be capable of maintaining an attitude preferably normal to the tangent of the cross section surface at the point of stitching contact.

In view of the three-directional force and motion requirements of a modern radial tire stitching apparatus, it has been determined that standard stitching equipment is not suitable nor acceptable. Furthermore it has been ascertained that stitchers which have been designed and developed to meet such multi-directional stitching requirements are both complicated and undesirable because of their complexity, inflexibility, and maintenance problems.

SUMMARY OF THE INVENTION

The present invention is directed to a stiching apparatus that is readily adaptable to the consolidating of tire components on all tire building drums, including the modern solid deck expanding drum type.

The stitcher apparatus of the present invention consists of right and left hand stitcher assemblies that are capable of lateral displacement toward and away from each other and thereby imparting a similar longitudinal displacement capability to the stitcher wheels parallel to the axis of the tire building drum. The uniquely designed mechanism provides a stitching method consisting of forceably engaging a pair of stitching wheels with the center of a rotating assembly of tire components and then following a controlled pattern approximately duplicating the contour of said rotating tire component assembly whether the geometric shape being consolidated is cylindrical or toroidal and upon completion of said stitching operation, have the ability to return to its initial rest position.

The stitcher wheels of the present invention are readily susceptible of movement for engaging a rotating assembly and imparting lateral movement thereto so as to follow the contour of the rotating assembly in the forming and stitching of belted radial ply tires.

DESCRIPTION OF THE PREFERRED EMBODIMENT

Figure 1:
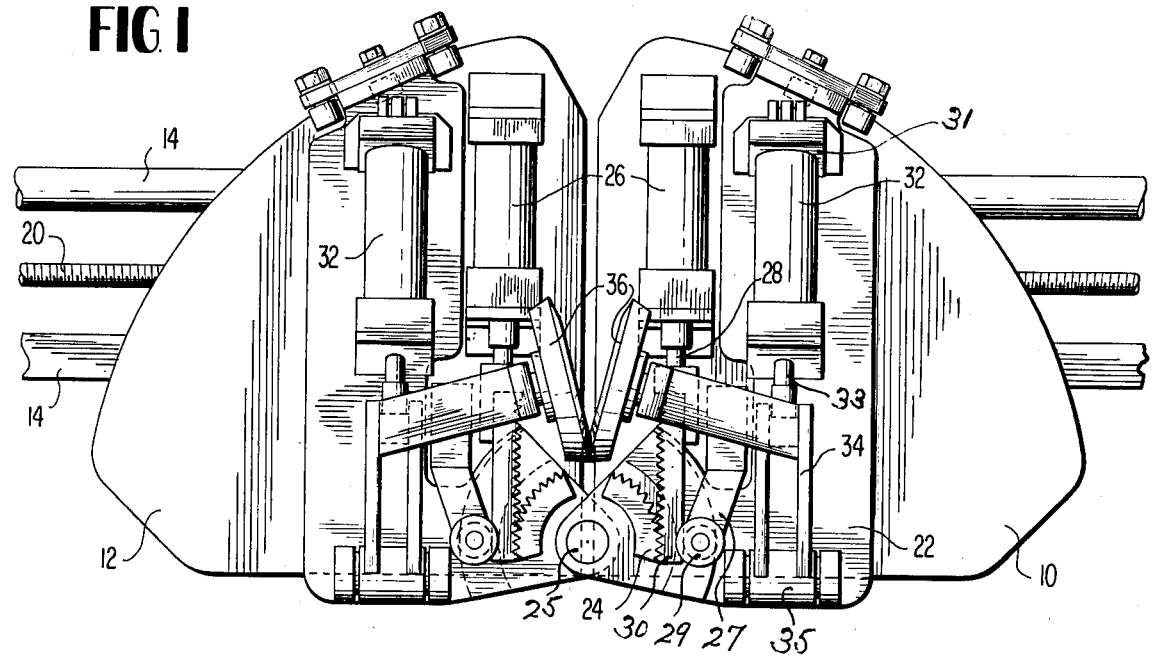
FIG. 1 is a plan view of a tire stitching apparatus embodying the present invention.
Figure 2:
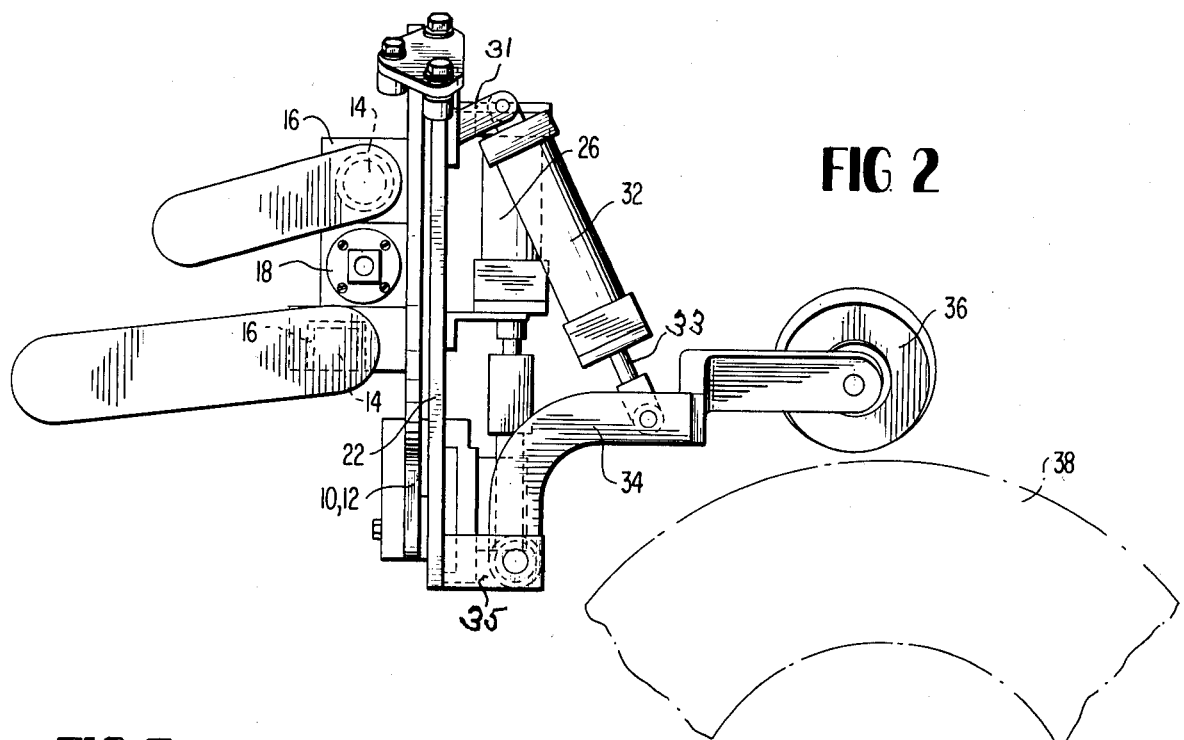
FIG. 2 is a side elevational view of the tire stitching apparatus shown in FIG. 1.

The stitching apparatus as shown in FIG. 1 consists of a right hand assembly and a left hand assembly which are nearly mirror images so that the following description will be directed to the right hand assembly with the understanding that the two assemblies operate in opposed unison with respect to one another.

A base member 10 is provided, on the rear surface thereof, with a pair of linear bearing means 16 which are mounted on a pair of spaced guideways 14 that are provided on the tire building machine, not shown. The bearing means 16 have associated therewith on the base member 10 a drive nut 18 which is adapted to receive a threaded rod member 20. A single rod member may be employed for both the right hand and left hand assemblies, however, the threads of each half of the rod member are of opposite hand. The rod member 20 is provided with a suitable drive means such as a motor, not shown, for causing the drive nut 18 and base member of each assembly to move along the guideways 14 in one direction upon the rotation of the rod member and to move in the opposite direction upon the rotation of the rod member in the other direction.

Figure 3:
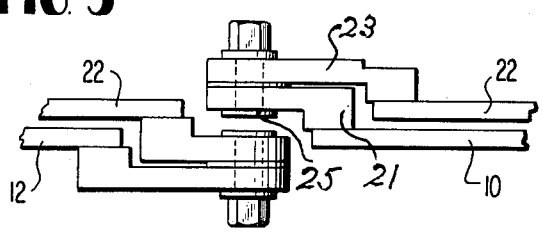
FIG. 3 is a detailed sectional view showing the relationship of a portion of the two stitcher assemblies.

The base member 10 at the lower end portion contiguous to the base member 12 is provided with an offset projection 21 that is arranged in stepped up relationship to said base member, FIG. 3. A portion of the base member 10 has positioned thereabove in spaced parallel relation a platform 22 which is also formed with an extension 23 that is complimentary in configuration to the projection 21. A pin 25 connects the extension 23 to the projection 21 for rotatably movement of the platform thereabout. An examination of FIG. 3 will readily disclose that the left hand assembly is formed similar to the right hand assembly except that the projection and extension are carried by the lower or bottom surfaces of the base member and platform in the left hand assembly. This variation enables the projection and extension in both assemblies to be carried by a pin with the vertical axis of both pins being coaxial with one another when the two assemblies are in substantially abutting engagement.

The extension 23 of the platform 22 is provided with a gear segment 24 that is engaged by a rack member 30 carried by a piston 28 which projects outwardly from a cylinder 26. the cylinder is mounted on the base member 10 adjacent the platform 22 while a depending arm 27 on the base member 10 has a roller 29 in the distal end thereof. The roller 29 engages the rack member 30 to insure its proper meshing with the gear segment upon the actuation of the piston 28 in the cylinder 26. While other means for rotating or pivoting the platform on the base member 10 could be used, a positive flow control hydraulic system utilizing precision flow splitters, not shown, was utilized because of the ease and precision with which it provides coordinated and controllable rotational manipulation of the platform members.

The lower end of the platform 22 is provided with a bracket 35 to which one end of an arm 34 is pivotally mounted while the other or free end of the arm has a stitcher wheel 36 rotatable mounted thereon. The platform 22 has a plate and arm 31 secured to the upper portion thereof with one end of a cylinder 32 pivotally connected to said arm. The cylinder 32 has a piston 33 projecting therefrom with the free end of the piston being pivotally connected to the arm 34. The cylinder 32 and piston 33 are preferably of the pneumatic type so as to permit a controlled movement of the arm 34 and thus urge stictcher wheel 36 through an arcuate path in its movement into and out of engagement with the material 38 that is to be consolidated in building the tire body. A pneumatic means for manipulation of arm 34 was deemed preferable for the present embodiment due to the compressibility of pneumatic systems and their ability to transmit a relatively constant force regardless of minor variations of the surface of the material being consolidated.

In the use of the stitching apparatus of the present invention the actuation of the cylinder 32 and piston 33 will move the stitcher wheel 36 into engagement with the material 38 to effect the consolidation thereof. At the outset of the operation the stitcher wheels 36 of the right and left hand assemblies must be capable of assuming an adjacent and parallel position with respect to one another so as to be capable of engaging the center of the material or tire 38. In addition the stitcher wheels 36 must have the capability of rotating about an imaginary axis passing through the tire body near its shoulder areas thus enabling the stitcher wheels to trace a curved path approximating the contour of the shoulders of the tire. In order to meet these requirements it became necessary to arrange the projections 21 and extensions 23 in the manner as shown in FIG. 3 so that the pivotal point axis of said base members and platforms be approximately coaxial when the stitcher wheels 36 are in closest proximity to one another as shown in FIG. 1. The rotation of the rod member 20 will result in the outward movement of the stitcher wheels 36 over the surface of the rotating tire so as to displace any entrained air bubbles to an open edge of the tire building material 38. As the stitcher wheels 36 approach the shoulder area of the tire body the gear segment 24 will be actuated by the rack 30 to pivot the platform 22 with respect to the base member 10-12 so as to enable the stitcher wheels to follow the contour of the tire body during the stitching operation. Once the stitcher wheels have reached the edge of the tire body material 38 the direction of rotation of the rod member 20 is reversed to return the base members 10-12 to their initial position.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An apparatus for stitching on a tire building drum having rounded shoulders a plurality of superimposed rubberized fabric sheets, said apparatus comprising a pair of base members, means for moving said base members in opposite directions along a linear path parallel to the axis of rotation of said drum, a platform arranged in spaced parallel relation to each base member and pivotally connected thereto, a stitcher wheel pivotally connected to each platform, means carried by each platform for moving said stitcher wheel into and out of engagement with said drum, a driven member provided on each platform, and driving means mounted on said base members and engaging said driven member for rotating said platform about said pivotal connection and moving said stitcher wheels over said drum and rounded shoulders.

2. An apparatus for stitching as set forth in claim 1 wherein said first named means includes a threaded rod member having threads on one half running in a direction opposite to the threads on the other half and a drive nut mounted on each base member and engaging one half of said threaded rod.

3. An apparatus for stitching as set forth in claim 1 wherein one of said base members has an offset projection on its upper surface and said other base member has an offset projection on its lower surface with said projections overlapping one another and said platforms having extensions arranged complementary to said projections with a pin connection the projection and extension of each base member and platform so that said pins are in coaxial alignment when said base members are positioned adjacent one another.

4. An apparatus for stitching as set forth in claim 1 wherein said second mentioned means constitutes a pneumatically actuated cylinder and piston structure.

5. An apparatus for stitching as set forth in claim 1 wherein said driven member constitutes a gear segment and said driving means constitutes a rack actuated by a cylinder and piston mounted on said base member.

6. An apparatus for stitching as set forth in claim 5 wherein a roller carried by said platform engages said rack to retain same in engagement with said gear segment.

7. An apparatus for stitching as set forth in claim 3 wherein said extensions of said platforms are provided with gear segments rotatably driven by racks affixed to piston and cylinder structures mounted on said base members.

* * * * *